June 16, 1964  W. H. HOLZHAUSE  3,137,448
ADAPTER FOR AN AUTOMOBILE TAIL LIGHT
Filed Dec. 13, 1962
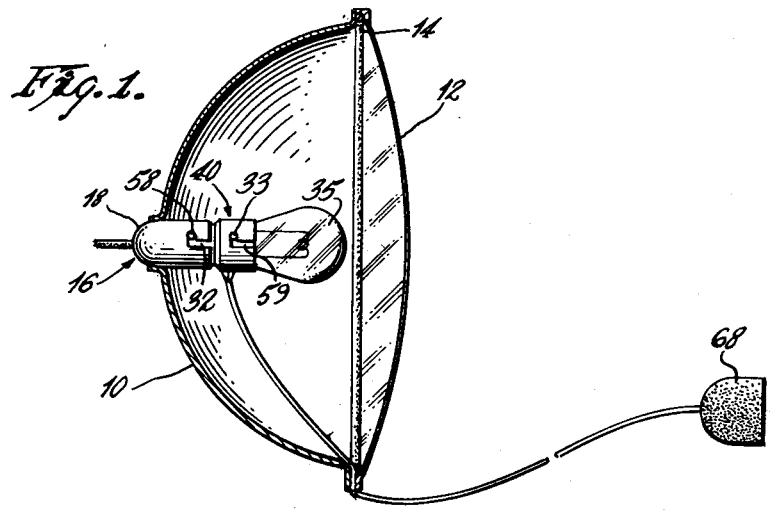
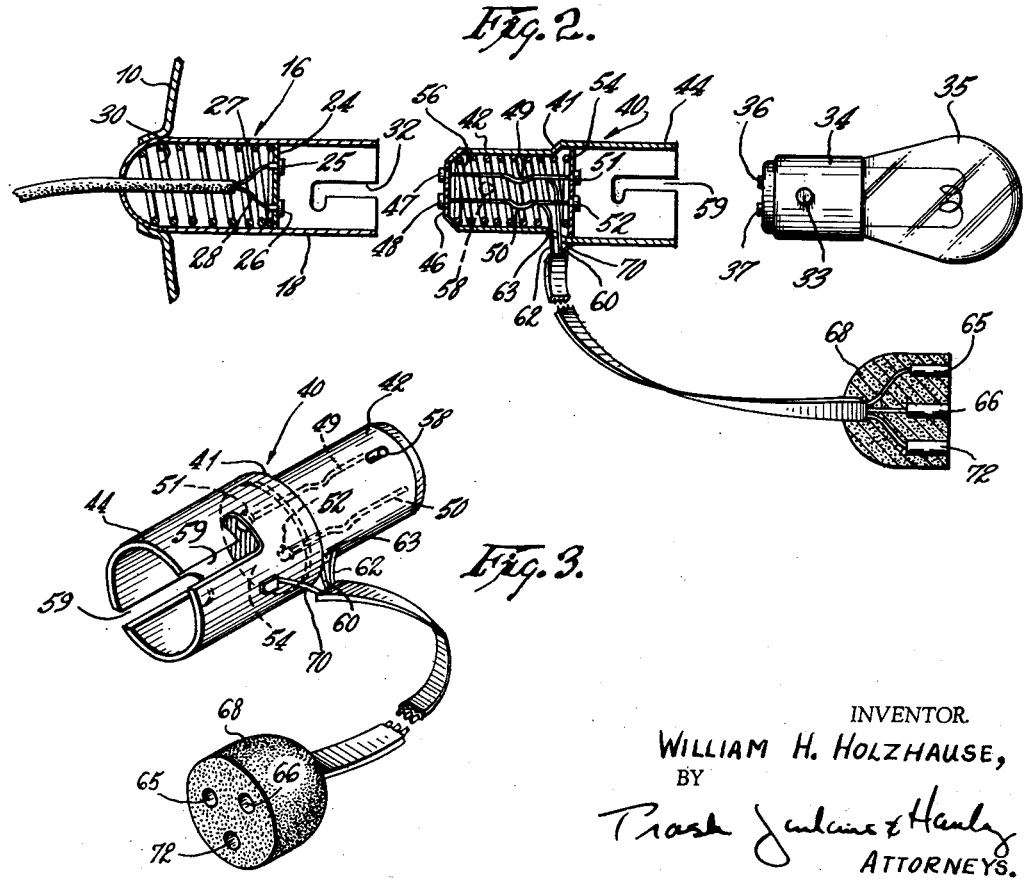
INVENTOR.
WILLIAM H. HOLZHAUSE,
BY
ATTORNEYS.

United States Patent Office 3,137,448
Patented June 16, 1964

3,137,448
ADAPTER FOR AN AUTOMOBILE TAIL LIGHT
William H. Holzhause, 4239 Mayflower Blvd.,
Columbus, Ohio
Filed Dec. 13, 1962, Ser. No. 244,414
6 Claims. (Cl. 240—8.3)

This invention relates to an adapter for a tail light for an automobile, and more particularly to such an adapter for supplying electrical power to the tail light of a trailer towed by said automobile.

It has heretofore been a laborious and time consuming task to electrically connect an automobile to a trailer so that the tail lights on the automobile and trailer simultaneously function in the same manner and sequence. The leads from the electrical circuit for the tail lights on the trailer must be connected to the electrical circuit for the tail lights on the automobile, but the wires included in the automobile tail light circuits in many automobiles are not in a position of ready access, and frequently panels, plates, etc. must be removed from the automobile to gain access to its tail light circuit for effecting the connection. Furthermore, in order to interconnect corresponding wires in the trailer and automobile tail light circuits, the the correct wires in the automobile circuit must be located, and in most instances, this is accomplished by trial and error.

It is therefore the general object of my invention to provide an adapter for an automobile tail light which will supply electrical power to the tail light of a trailer towed by said automobile, and which can be easily and quickly connected to the tail light circuits of said trailer and automobile for effecting the simultaneous ignition of the tail lights in both circuits in the same sequence. It is a further object of my invention to provide such an adapter which can be employed in combination with conventional automobile tail light sockets and bulbs, and which can be housed within the tail light assembly for an automobile.

Other objects and features of my invention will become apparent from the more detailed description which follows and from the accompanying drawing, in which:

FIG. 1 is a vertical section of an automobile tail light assembly having an adapter embodying my invention mounted therein;

FIG. 2 is an exploded view of the tail light socket and bulb and adapter shown in FIG. 1, but showing said adapter and socket in section; and FIG. 3 is a perspective view of the adapter shown in FIG. 1.

A conventional tail light assembly on an automobile comprises a rearwardly directed reflector 10 mounted on the rear of the vehicle and having its open face enclosed by a lens 12. The lens 12 is normally removably mounted on the reflector 10 by screws (not shown) with a resilient gasket 14 interposed between the peripheral edges of said reflector and lens.

Carried within the reflector 10 is a socket 16 which conventionally comprises a rearwardly open metal jacket 18 carrying a disc 24 formed from a non-conductive insulating material and having a pair of contacts 25 and 26 mounted thereon. The contacts 25 and 26 are connected to wires 27 and 28 which project forwardly through a spring 30 acting between the jacket and disc 24 for connection to the electrical power source of the vehicle. At its rearwardly disposed open end, the jacket 18 has a pair of circumferentially spaced L-shaped locking slots 32, which in normal usage receive studs 33 mounted on the shank 34 of a bulb 35 for releasably locking the bulb in the socket 16 so that contacts 36 and 37 on said bulb will engage the contacts 25 and 26 of the socket.

In this conventional construction and application, current is supplied through the contacts 25 and 26 to the bulb contacts 36 and 37 for lighting the tail light. The contacts 25 and 36 continuously light the bulb 22 to provide a clearance light for the automobile, and the current to the contacts 26 and 37 is controlled by appropriate switching mechanisms not a part of this invention to light the bulb 22 to provide a stop signal and turning signal.

My adapter may be used in combination with such sockets and bulbs, and may be employed in such combination within the confines of a conventional tail light reflector 10 and its lens 12. As shown, the adapter comprises a sheet-metal casing 40 shouldered intermediate its length, as at 41, to provide lesser and greater diameter sections 42 and 44, respectively. The casing section 42 is closed by a plate 46 formed from a non-conductive insulating material and connected to the casing 40. A pair of contacts 47 and 48 are mounted on the plate 46 and are connected to a pair of wires 49 and 50 extending rearwardly from the plate 46 and joined to a pair of contacts 51 and 52 mounted on a non-conductive disc 54 carried within the casing section 44. In the embodiment of my invention illustrated in the drawings, a coil spring 56 is interposed between the disc 54 and plate 46 for urging said disc toward the open end of the casing section 44. Conveniently, any resilient means, such as the spring 56, a resilient foam block, etc. may be carried in the housing section 42 for biasing the disc 54 rearwardly. The outer diameter of the casing section 42 corresponds to the inner diameter of the socket jacket 18, and said casing section is provided with a pair of studs 58 receivable in the socket locking slots 32 for mounting the adapter in the socket with its contacts 47 and 48 engaging the contacts 25 and 26. The casing section 44 has an inner diameter corresponding to the outer diameter of the bulb shank 34, and is provided with a pair of forwardly extending L-shaped slots 59 for the reception of the studs 33 on the bulb shank 34 for thus releasably locking the bulb in the adapter with its contacts 36 and 37 engaging the adapter contacts 51 and 52. Thus, with the adapter connected to the socket 16 and the bulb 35 connected to the adapter, said bulb will function in the same manner and sequence as if it were directly connected to the socket 16 in the conventional manner.

The interconnections between the adapter and socket and bulb effected by the cooperating studs and slots coupled with the rearwardly biased contacts 25 and 26 and 51 and 52 insures that the several sets of contacts will be retained in operative connection with each other irrespective of any sudden stops or starts of the automobile. The shoulder 41 limits the forward movement of the disc 54, and the wires 49 and 50 limit its rearward movement.

In order to transfer the electrical power from the socket 16 to a trailer, a pair of wires 60 and 62 are operatively connected to the contacts 47 and 48, as through the wires 49 and 50, and project outwardly from the casing 40 through an opening 63 immediately forward of the disc 54. The ends of the wires 60 and 62 opposite the wires 49 and 50 are connected to a pair of contact points 65 and 66 of a female plug 68. While in most instances, the electrical circuit of a trailer will be grounded through the automobile-trailer connection, it may be desirable to provide an additional ground. To this end, a wire 70 is connected to the casing 40 and to a third contact point 72 in the plug 68.

When not in use, the plug 68 and the wires 60, 62 and 70 may be coiled within the reflector 10 and retained therein by the lens 12. However, when it is desired to electrically connect a trailer to the automobile, the lens 12 is removed and the plug 68 is withdrawn from the reflector, and the lens 12 then remounted on said reflector. The resiliency of the gasket 14 permits the remounting of the lens 12 on the reflector irrespective of the wires extending between said lens and reflector. A mating male plug on the trailer electrical system can then be connected to the plug 68 and to connect trailer tail light circuit to the tail light circuit of the automobile so that the tail light on the trailer will be simultaneously lit with the automobile tail light bulb 35 and will be lit in the same sequence as the bulb 35.

Of course, to provide tail lights at both sides of the rear of the trailer, adapters will have to be mounted in the tail light assemblies at both sides of the rear of the automobile. And while I have illustrated an embodiment in which a pair of contacts are employed in each of the socket, adapter, and bulb, any member of such contacts may be employed without departing from the spirit and scope of my invention.

It is to be understood that the term automobile as used herein is to include conventional automobiles, busses, tractors, trucks, and the like, and the term trailer as used herein is to include any vehicle which is towed by said automobile.

I claim:

1. In combination with an automobile tail light of the type comprising a socket and bulb carried within a reflector having a lens mounted thereon; an adapter comprising
    (a) an elongated casing having a closed end receivable in said socket and an open end for the reception of said bulb,
    (b) a first set of contacts at the closed end of said casing engaging contacts in said socket,
    (c) a non-conductive disc carried in said casing intermediate its ends and having a second set of contacts engaging contacts on said bulb,
    (d) a first set of wires interconnecting said first and second set of contacts for supplying electrical power from said socket to said bulb,
    (e) a second set of wires operatively connected to said first set of contacts and extending outwardly through an opening in said casing and connected to a plug matingly engageable wtih a plug connected to the tail light circuit of a trailer for supplying electric power from said socket to said tail light circuit, and
    (f) means on said casing for releasably connecting it to said socket and bulb.

2. The invention as set forth in claim 1 in which
    (a) said means comprises at least one stud projecting outwardly from said casing receivable in an L-shaped slot formed in said socket, and
    (b) at least one L-shaped slot extending inwardly from the open end of said casing for the reception of a stud on said bulb.

3. The invention as set forth in claim 1 in which
    (a) said second set of wires and plug are movable from a retracted position disposed wholly within the extent of said reflector to an operative position in which said second set of wires extend between said reflector and lens and said plug is disposed outside the extent of said reflector.

4. The invention as set forth in claim 1 with the addition that
    (a) a ground wire is interconnected between said casing and plug.

5. An adapter for a tail light for an automobile, comprising
    (a) an elongated casing having a first section closed at one of its ends by a non-conductive plate and connected at its opposite end to an open ended second section having a larger cross-sectional extent than said first section,
    (b) a first set of contacts on the outer face of said plate,
    (c) a non-conductive disc movably supported in said second section and having a second set of contacts on its face remote from said plate,
    (d) resilient means urging said disc in a direction away from said plate,
    (e) a first set of wires operatively interconnecting said first and second sets of contacts,
    (f) a second set of wires operatively connected to said first set of contacts and extending outwardly through an opening in said casing, and
    (g) means for releasably locking a bulb in said second section in operative contact with said second set of contacts and for releasably locking said first section in a tail light socket with said first set of contacts in operative contact with said socket, whereby the electrical power from said socket will be supplied to said bulb and to said second set of wires.

6. An adapter for tail lights as set forth in claim 5 in which
    (a) said disc has a cross-sectional extent greater than said first section and movement of said disc in said section is limited by said first set of wires and by the end of said first section remote from said plate.

References Cited in the file of this patent
UNITED STATES PATENTS

| | | |
|---|---|---|
| 1,949,155 | Fenzlein | Feb. 27, 1934 |
| 2,671,848 | Swayne | Mar. 9, 1954 |
| 2,671,891 | Kent | Mar. 9, 1954 |
| 2,994,059 | Dahlgren et al. | July 25, 1961 |
| 3,083,292 | Roe et al. | Mar. 26, 1963 |